(12) United States Patent
Wigard et al.

(10) Patent No.: US 11,307,310 B2
(45) Date of Patent: Apr. 19, 2022

(54) METHODS FOR MANAGING NEIGHBOR RELATIONS AND COORDINATING PHYSICAL CELL IDENTIFIERS FOR MOVING HIGH ALTITUDE PLATFORM SYSTEMS

(71) Applicant: Nokia Technologies Oy, Espoo (FI)

(72) Inventors: Jeroen Wigard, Klarup (DK); Ingo Viering, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/212,492

(22) Filed: Mar. 25, 2021

(65) Prior Publication Data

US 2021/0325550 A1 Oct. 21, 2021

Related U.S. Application Data

(60) Provisional application No. 63/010,811, filed on Apr. 16, 2020.

(51) Int. Cl.
*G01S 19/51* (2010.01)
*H04W 36/04* (2009.01)
*H04W 36/32* (2009.01)
*H04W 92/20* (2009.01)

(52) U.S. Cl.
CPC ............ *G01S 19/51* (2013.01); *H04W 36/04* (2013.01); *H04W 36/32* (2013.01); *H04W 92/20* (2013.01)

(58) Field of Classification Search
CPC . H04W 36/0061; H04W 76/11; H04W 24/02; H04W 36/00835; H04L 5/0051
See application file for complete search history.

(56) References Cited

U.S. PATENT DOCUMENTS

| | | | |
|---|---|---|---|
| 2013/0017776 A1* | 1/2013 | Takano | H04B 7/15507 455/7 |
| 2013/0084892 A1 | 4/2013 | Teyeb et al. | |
| 2014/0073304 A1 | 3/2014 | Brisebois et al. | |
| 2014/0321447 A1* | 10/2014 | Ozturk | H04W 60/00 370/338 |
| 2016/0212632 A1 | 7/2016 | Katamreddy et al. | |
| 2017/0238243 A1* | 8/2017 | Park | H04W 48/16 455/434 |
| 2018/0035334 A1* | 2/2018 | Lohar | H04W 28/0205 |
| 2018/0199157 A1* | 7/2018 | Talluri | H04W 64/006 |

(Continued)

FOREIGN PATENT DOCUMENTS

| | | |
|---|---|---|
| EP | 2689603 B1 | 8/2018 |
| WO | 2012/135120 A1 | 10/2012 |
| WO | 2019/011427 A1 | 1/2019 |

OTHER PUBLICATIONS

Extended European Search Report received for corresponding European Patent Application No. 21165204.5, dated Sep. 24, 2021, 10 pages.

(Continued)

*Primary Examiner* — Dung Hong
(74) *Attorney, Agent, or Firm* — Squire Patton Boggs (US) LLP

(57) ABSTRACT

Systems, methods, apparatuses, and computer program products for managing neighbor relations and coordinating physical cell identifier (PCIs), for example, for moving high altitude platform systems are provided.

18 Claims, 5 Drawing Sheets

(56) References Cited

U.S. PATENT DOCUMENTS

| | | | |
|---|---|---|---|
| 2018/0332513 A1 | 11/2018 | Cao et al. | |
| 2019/0182725 A1* | 6/2019 | Donepudi | H04W 76/11 |
| 2019/0230530 A1* | 7/2019 | Henriksson | H04W 24/04 |
| 2020/0236573 A1* | 7/2020 | Zhang | B64C 39/024 |
| 2021/0058835 A1* | 2/2021 | Luo | H04W 36/0055 |
| 2021/0250822 A1* | 8/2021 | Mishra | H04W 76/11 |
| 2021/0321311 A1* | 10/2021 | Lu | H04W 36/0061 |

OTHER PUBLICATIONS

"3rd Generation Partnership Project; Technical Specification Group Radio Access Network; Solutions for NR to support non-terrestrial networks (NTN) (Release 16)", 3GPP TR 38.821 V0.4.0, Mar. 2019, pp. 1-46.

"Inclusion of Geographical Area and E-UTRAN Access Point Position information", 3GPP TSG-RAN3 Meeting #67, R3-100699, NTT Docomo, Feb. 22-26, 2010, 18 pages.

"Flightradar24: Live Flight Tracker—Real-Time Flight Tracker Map", Flightradar24, Retrieved on Mar. 24, 2021, Webpage available at : https://www.flightradar24.com/HBAL066/24001eb7.

"3rd Generation Partnership Project;Technical Specification Group Radio Access Network;Evolved Universal Terrestrial Radio Access Network (E-UTRAN);X2 application protocol (X2AP) (Release 16)", 3GPP TS 36.423, V16.0.0, Dec. 2019, pp. 1-432.

"3rd Generation Partnership Project;Technical Specification Group Radio Access Network;Evolved Universal Terrestrial Radio Access (E-UTRA) and Evolved Universal Terrestrial Radio Access Network (E-UTRAN); Overall description; Stage 2 (Release 16)", 3GPP TS 36.300, V16.0.0, Dec. 2019, pp. 1-366.

"3rd Generation Partnership Project;Technical Specification Group Radio Access Network; NG-RAN;Xn application protocol (XnAP) (Release 16)", 3GPP TS 38.423, V16.0.0, Dec. 2019, pp. 1-330.

"Solution(s) to the 36.902's Automated Configuration of Physical Cell Identity Use Case", 3GPP TSG-RAN WG3 Meeting #59-bis, R3-080812, Agenda : 10.1.1a, Nokia Siemens Networks, Mar. 31-Apr. 3, 2018, 7 pages.

"Managing PCI Collisions in NR-U", 3GPP TSG-RAN WG2 #105, R2-1901749, Agenda : 11.2.2.1, Ericsson, Feb. 25-Mar. 1, 2019, pp. 1-3.

* cited by examiner

METHODS FOR MANAGING NEIGHBOR RELATIONS AND COORDINATING PHYSICAL CELL IDENTIFIERS FOR MOVING HIGH ALTITUDE PLATFORM SYSTEMS

CROSS REFERENCE TO RELATED APPLICATIONS

This application claims priority from U.S. Provisional Application No. 63/010,811, filed on Apr. 16, 2020. The entire contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for managing neighbor relations and coordinating physical cell identifier (PCIS), for instance, for moving high altitude platform systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein.

SUMMARY

Figure 1:
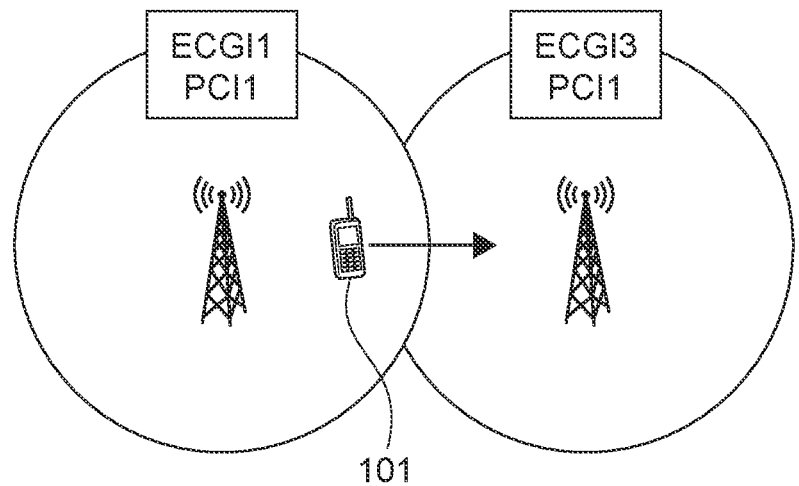
FIG. 1 illustrates an example of a PCI collision problem.

According some aspects, there is provided the subject matter of the independent claims. Some further aspects are defined in the dependent claims. The embodiments that do not fall under the scope of the claims are to be interpreted as examples useful for understanding the disclosure.

In a first aspect thereof the exemplary embodiments of this invention provide a method that comprises receiving, at a first network node, geolocation information for at least one second network node; managing, by the first network node, relations of neighbor network nodes of the first network node and/or the at least one second network node; and resolving physical cell identifier problems using the geolocation information.

In a further aspect thereof the exemplary embodiments of this invention provide an apparatus that comprises at least one processor; and at least one memory comprising computer program code, the at least one memory and computer program code are configured, with the at least one processor, to cause the apparatus at least to receive geolocation information for at least one first network node; manage relations of neighbor network nodes of the apparatus and/or the at least one first network node; and resolve physical cell identifier problems using the geolocation information.

In another aspect thereof the exemplary embodiments of this invention provide a computer program embodied on a non-transitory computer-readable storage medium. The computer program comprising program code for controlling a process to execute a process. The process comprising receiving, at a first network node, geolocation information for at least one second network node; managing, by the first network node, relations of neighbor network nodes of the first network node and/or the at least one second network; and resolving physical cell identifier problems using the geolocation information.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for managing neighbor relations and coordinating physical cell identifier (PCIS) for moving high altitude platform systems or aerial base stations, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments described herein can address at least the problem of managing neighbor relations and X2 interfaces and allocating physical cell identifier (PCIS) in the case of moving high altitude platform systems/stations (HAPS) using the same frequency as the terrestrial network. It is noted the example embodiments are not just applicable to HAPS, as certain embodiments may similarly be applied to drones with flying base stations or aerial access points. As such, according to some embodiments described herein, a HAPS may alternatively be a flying base station or aerial access point. Further, it should be noted that example embodiments discussed herein are described with LTE terminology; however, example embodiments are equally applicable to 5G and other future systems as well.

High Altitude Platform Systems (HAPS) refer to a new telecommunication infrastructure solution for rural and remote areas, as well as to provide extra capacity or as a backup solution (e.g., in case terrestrial networks fail) in other areas such as urban areas, based on stratospheric airborne platforms. The HAPS are proposed to operate at altitudes between, for example, 3 to 22 kilometers (km) to cover a service area up to 1,000 km diameter and 800,000 square km depending on the minimum elevation angle accepted from the user's location. HAPS can be based on balloons or on solar powered high-altitude planes.

HAPS are covered in the $3^{rd}$ generation partnership project (3GPP) under the Non-Terrestrial Networks (NTN) work item (WI), which also covers low earth orbit (LEO) and geostationary (GEO) satellites, in addition to HAPS. The issues specifically mentioned in the WI related to HAPS include co-existence with terrestrial networks. The co-existence issues arise from the desire to operate the HAPS as part of the same public land mobile network (PLMN) on the same frequency as the terrestrial network.

It is typically assumed that the HAPS fill coverage holes of the terrestrial networks, and create negligible interference to the areas covered by the terrestrial network. However, handovers between terrestrial cells and HAPS are relevant. For example, handover from HAPS to terrestrial cell may be performed to rescue UEs from terrestrial interference, and handover from terrestrial cell to HAPS may be performed to rescue UEs from terrestrial coverage hole.

Proper handover performance is only achieved if the source cells have proper neighbor cell lists, i.e., if the target cells are well planned with regards to their Physical Cell Identifier and the source cell knows the global cell ID (ECGI)—of the neighboring cells. Then, the source cell can initiate proper handovers to correct target cells.

It is also important to note that the HAPS are moving (in contrast to terrestrial base stations), but not necessarily in a recurring and predictable way (in contrast to satellite nodes).

Physical Cell identifiers (PCIs) typically have two sometimes contradicting targets. First, PCIs have to be short in order to ease the detection for the terminal (e.g., UE). It is noted that in most cases the cell identifiers are coded into the reference (pilot) signals that are used for cell detection. So, PCIs have to be read without knowing anything from a cell, without being able to estimate the channel, and without having synchronization to a cell. This makes the PCI detection a rather complex hypothesis test. Additionally, PCIs should be unique in a local neighborhood. A large set of PCIs (i.e., long identifiers) may be needed for this purpose.

This uniqueness requirement implies two conditions that could result in PCI collision and PCI confusion, as discussed in more detail in the following. Obviously, neighbors must have different PCIs, otherwise they cannot be distinguished. Violation of this condition may be referred to as PCI collision. FIG. 1 illustrates an example of a PCI collision problem. Enhanced cell global identifier (ECGI) is the LTE terminology for a global (i.e., unique) cell identifier, which is too long for cell detection. As illustrated in the example of FIG. 1, the terminal 101 may interpret ECGI3 as an echo of the own signal, i.e., the terminal 101 would not even realize that there is another cell. At some point, the terminal 101 may drown in the interference of ECGI3 and therefore may suffer a failure (e.g., radio link failure).

Figure 2:
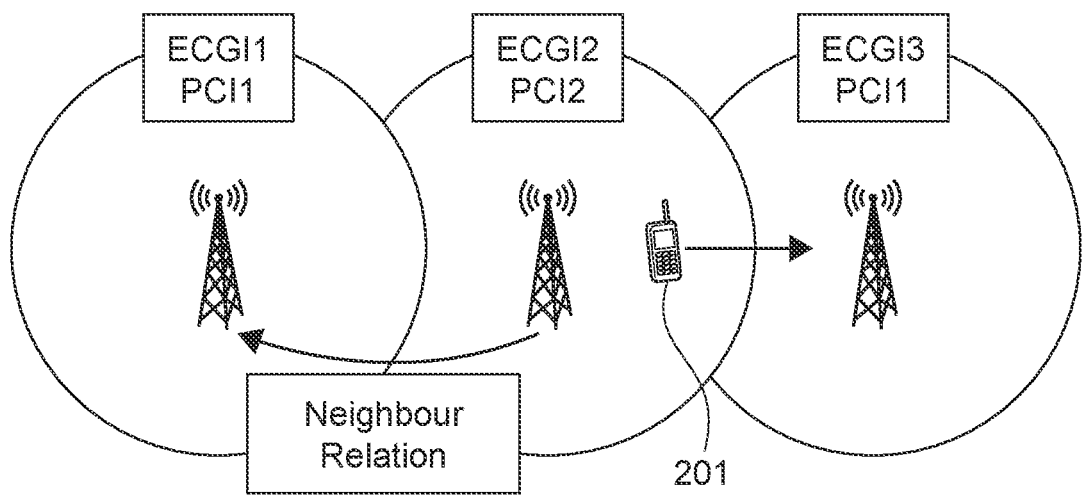
FIG. 2 illustrates an example of a PCI confusion problem.

Less obviously, neighbors of neighbors must also have different PCIs. Violation of this condition may be referred to as PCI confusion. FIG. 2 illustrates an example of the resulting PCI confusion problem, where the two cells ECGI1 and ECGI3 have the same PCI1. As illustrated in the example of FIG. 2, the UE 201 may move from cell ECGI2 to ECGI3 and may report PCI1. The serving cell ECGI2 does not know to which cell it should initiate the handover. Therefore, it may initiate the handover to ECGI1, which will obviously result in a failure.

Unfortunately, in real terrestrial networks, it is not obvious at all which cells have a neighbor relation. For instance, in networks with a very dense deployment, a single cell may have more than 50 neighbors. This is a result of unexpected propagation such as coverage overshots of far distant cells. As a result, the expression "neighbor relation" has a more abstract meaning, far beyond a pure geographical meaning, at least in classical terrestrial networks; this is why network planning alone cannot solve the neighbor relation problems and/or PCI problems reliably, and neighbor relation problems and/or PCIs have to be optimized and/or corrected dynamically during operation.

An early observation can be made that neighbor relation problems and/or PCI problems in classical terrestrial networks arise from unpredictable propagation (although base stations are static). Current solutions are tailored to this assumption. HAPS, however, have predominantly line-of-sight connections, and thus propagation is well predictable; HAPS are moving across the terrestrial cells, which also requires neighbor relation/PCI optimization and/or correction during operation, but due to completely different reasons and therefore solutions may also look different.

In the following, the occurring problems with neighbor relations and PCIs will be described in more detail. For these purposes, as an example, it is assumed that HAPS will be dedicated an exclusive set of PCIs. This simplifies the problem massively without introducing sever restrictions to PCI allocation. For instance, as one example, with 504 existing PCIs (as an LTE example), the terrestrial cells may use PCI 1 . . . 470, whereas HAPS may use PCI 471 . . . 504. This is typically called PCI fragmentation.

Figure 3:
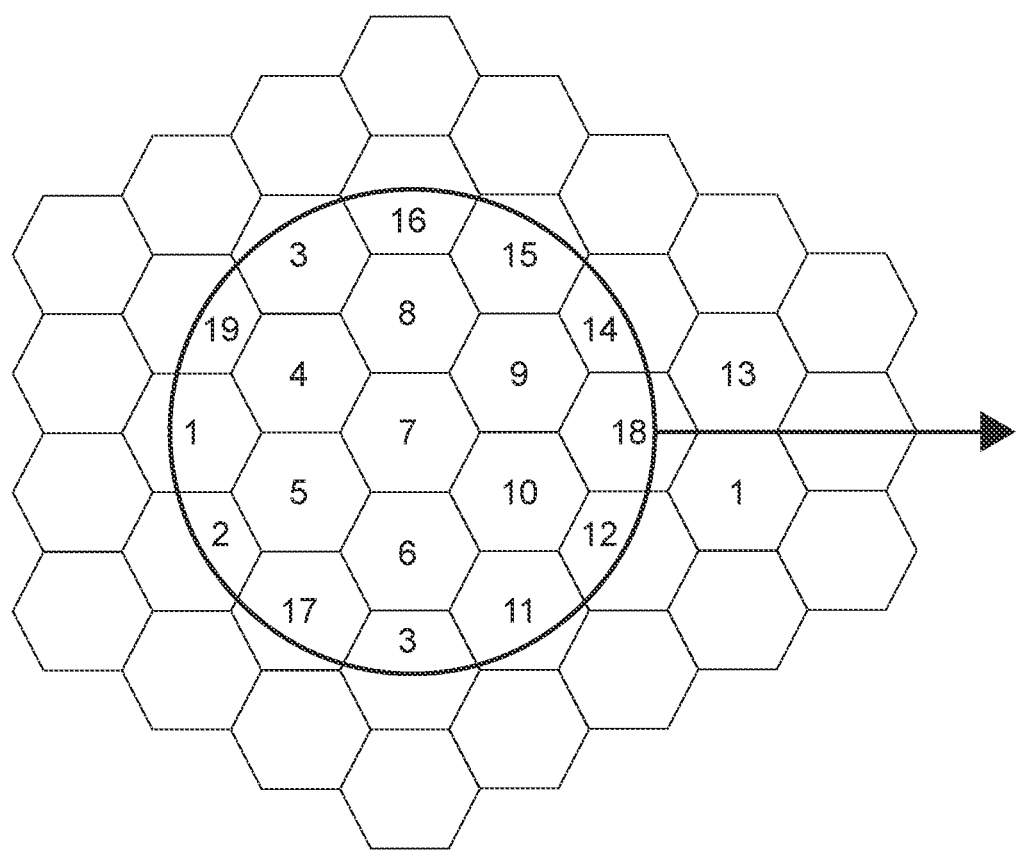
FIG. 3 illustrates an example terrestrial network with hexagonal cells, according to an embodiment.

FIG. 3 illustrates an example terrestrial network with (small) hexagonal cells. In this example, PCIs have been assigned to the relevant terrestrial cells. For the sake of simplicity, the example of FIG. 3 shows the coverage area of a single HAPS which is flying from the left to the right across the terrestrial network.

The coverage of the HAPS is much larger than that of a terrestrial cell (in reality it will be even much larger than shown in the example of FIG. 3). With the above assumption of PCI fragmentation, there will never be a PCI collision between terrestrial cell and HAPS. However, the following neighbor relation/PCI problems may still occur. New terrestrial cells are covered (e.g., cell 13), and new neighbour relations are needed. "Old" terrestrial cells leave the HAPS coverage and shall be removed (e.g., cells 2, 19). New terrestrial cells may have the same PCI as an existing PCI (e.g., cells 1). This may lead to PCI confusion. This indicates again the importance of deleting "old" cells as soon as possible. A HAPS may persistently cover multiple terrestrial cells with same PCI (e.g., cells 3), which leads to unavoidable PCI confusion. It seems impossible that the terrestrial PCI allocation avoids this confusion, at least if the HAPS coverage approaches 504 terrestrial cells (504 is the number of available PCIs in LTE). As such, a work around for this PCI confusion needs to be found.

There are also the typical PCI problems among the HAPS (PCI collision and confusion). However, example embodiments can also solve the PCI problems between HAPS as explained in more detail below.

Additionally, it is also desirable to avoid impact to terrestrial networks as much as possible. For example, new functionality in the terrestrial network should be minimized and new functionality should be predominantly in the HAPS, as the number of HAPS cells is expected to be much lower than the number of terrestrial cells.

As mentioned above, current solutions to the neighbor relation and PCI problem are tailored for terrestrial networks with static base stations and unpredictable propagation. When network planning for terrestrial networks, as a first step, the PCI allocation and neighbor relations are pre-planned as well as possible before the network is rolled out or before additional cells are installed. This is based on geographical coordinates and appropriate propagation models. Geographical coordinates are well-known and fixed, but propagation models are never perfectly accurate and propagation may even change over time (buildings might be added or removed, trees have falling leaves). Hence, for such terrestrial networks, the planned neighbor relations/PCI allocation is never perfect and dynamic PCI optimization/correction is needed as well as optimization of neighbor relations. This may also be referred to as automatic neighbor relation (ANR).

Instruments for dynamic ANR and PCI optimization and/or correction may include: ECGI reading by UEs, operation and maintenance (OAM) resolution of unknown PCI, Exchange of PCIs via X2 (e.g., via "eNB configuration update" message), network optimization through handover statistics, and/or network listening mode with Home base stations (HeNB).

Using ECGI reading by UEs, missing neighbor relations can be resolved. To do so, initially, the UE reports a PCI which is not known to the base station, i.e., the base station may not have an X2 interface and may not know which cell exactly (i.e., which ECGI or IP address) the UE should handover to. In this case, the base station may instruct the UE to read the ECGI of the unknown neighbor. The UE has to synchronize to the neighbor (detaching temporarily from the old cell), read the ECGI (which is part of the system information), return to the serving cell and report the ECGI reading. However, this approach has several drawbacks. For example, the feature may not be implemented by all UEs. Furthermore, it introduces unnecessary interruption to the UE where it has to detach and return, which also risks a failure. Finally, this will only solve the problem of missing neighbor relations, but not of PCI collision and confusion.

With OAM resolution of unknown PCI, instead of contacting the UE for retrieving the ECGI of an unknown neighbor, a UE may contact OAM. In turn, OAM may resolve the PCI using its global geometrical information of all cells in the network and other available information. For instance, OAM may determine the ECGI of the cell with the reported PCI which has the shortest distance to the cell that has requested the PCI resolution. However, this is typically not real-time. Hence, this approach can help in the long-term, but not for the UE at hand. As a result, OAM resolution is not helpful for the moving HAPS case.

With respect to the exchange of PCIs via X2, base stations can exchange information about their neighbors via X2 interface. More precisely, a base station may send PCI/ECGI pairs of its neighbors to a neighboring base station. This can be helpful to resolve unknown PCIs, may help to detect PCI confusion, etc. The corresponding message transmitted via X2 may be called "eNB configuration update" in LTE; however, as example embodiments are not limited to LTE, other terminology can be used according to certain embodiments, such as, but not limited to, "configuration update message."

With respect to network optimization through handover statistics, network management can regularly evaluate handover statistics. This evaluation may also reveal PCI issues, such as where certain Radio Link Failures (RLF) may reveal PCI collision (PCI before and after failure are the same), certain Handover Failures may reveal PCI confusion, and/or no activity on a cell boundary (i.e., no handovers) may reveal that a neighbor relation is obsolete and should be removed. However, these methods are also reactive and assume stationarity. Therefore, these methods would also not be applicable for moving HAPS.

HeNBs were designed to be installed without any planning (since their location was out of the control of the operator). Before switching their downlinks on, HeNBs could act as a UE measuring surrounding PCIs. For instance, a HeNB may pick a PCI that was not measured. It is noted that a base station cannot perform UE-like measurements without deactivating its downlink. Hence, for a moving HAPS, this procedure would need to be repeated regularly causing massive outage for the whole cell. Consequently, network listening mode by a base station is also only appropriate for static base stations. Furthermore, it does not solve the problem reliably, since it only takes measurements at the location of the base station (e.g., at the HAPS), which is not very relevant. Moreover, PCI confusion cannot be addressed with such a method.

As introduced above, there are important differences between conventional terrestrial networks and HAPS. For terrestrial networks, cell locations are static. Whereas, for HAPS, locations vary continuously. On the other hand, propagation between HAPS and UEs is much more predictable than between terrestrial cells and UEs (mainly line-of-sight (LOS) connection).

As will be discussed in more detail below, certain embodiments provide that base stations or other centralized entities exchange global positioning system (GPS) coordinates of neighbors for ANR and PCI optimization. In one embodiment, a first network node (e.g., HAPS, terrestrial or flying base station) may receive geolocation information (e.g., GPS coordinates) about one or more second network node(s) (e.g., a terrestrial base station or another HAPS) from a third network node (e.g., another HAPS, a terrestrial base station, a centralized entity, or HAPS manager). According to some embodiments, the second network node and the third network node may be the same node or different nodes. Receipt of the geolocation information about the second network node(s) may assist the first network node to manage its neighbor relations (e.g., to add/remove neighbor relations in terms of PCI/ECGI pairs or PCI/IP address pairs, add/remove X2 connections, etc.), and to resolve PCI problems. Additionally, in an example embodiment, the first network node may receive further geometrical instruction (e.g., a minimum/maximum distance) from a fourth network node (e.g., HAPS manager, OAM, or the third network node) determining the strategy to manage neighbor relations. Furthermore, in some embodiments, the first network node may inform the second or third network node(s) that the neighbor relation to the second network node is no longer relevant (e.g., the second network node is no longer in the coverage of the first network node).

Referring again to the example depicted in FIG. 3, according to an embodiment, the X2 information "eNB Configuration Update" may be extended to include GPS coordinates. For example, in one embodiment, a terrestrial base station or eNB/gNB may send GPS coordinates of its neighboring terrestrial base stations or eNBs/gNBs (along with the existing PCI/ECGI) and its own coordinates to a HAPS neighbor.

With this received information, the HAPS can resolve all problems discussed above, such as PCI collision and PCI confusion problems, and neighbor relation problems. In an embodiment, from the PCI/ECGI/GPS lists received from all existing terrestrial neighbors, the HAPS may recognize non-existing neighbors. For instance, according to the example of FIG. 3, cell 13 will show up in the X2 message of cell 9 or 10. Based on the GPS information, the HAPS can decide whether cell 13 shall be added immediately, later on, or not at all. It is noted, that "adding cell 13" may mean setting up an X2 interface and updating the neighbor cell list.

In an embodiment, based on the GPS information, the HAPS can also remove existing neighbors, if the distance increases the estimated HAPS coverage (e.g., 2). This decision may be simplified, if the HAPS knows a minimum distance between two terrestrial cells with the same PCI. If this minimum distance is large, then it can keep neighbor relations longer as this does not create any harm. If the minimum distance is short, then the HAPS may possibly delete neighbor relations earlier. As an example, if the minimum distance between terrestrial nodes with same PCI is, e.g., 120 km, and the HAPS coverage has a diameter of approximately 80 km, then the HAPS can safely keep the neighbors beyond a distance of 40 km (measured from the cell center) and release them only at a distance of 60 km, without having risk of PCI confusion and missing neighbor relation. Without this information, the HAPS may have to delete it at 40 km distance to avoid risk of PCI confusion, however which may increase the risk of missing neighbor relation.

Still referring to the example of FIG. 3, in the X2 message of cell 10, the HAPS may recognize that there is a new ECGI with new GPS coordinates, but with the same PCI (e.g., cell 1) as an already existing cell. As a result, the HAPS is aware of a PCI confusion. In the case of cell 1, the HAPS may decide, based on the GPS coordinates, to delete the neighbor relation to avoid the PCI confusion (since the old cell 1 is almost gone). In case of cell 3, the PCI confusion is more persistent since both cells with PCI 3 are relevant. Nevertheless, provided the HAPS has at least very rough location information of the UEs, it is still able to resolve, from the PCI, the ECGI and thereby the correct X2 interface for the handover. In some examples, the rough location information of the UEs can be obtained either by GPS coordinates reported by the UEs, or by radio frequency (RF) finger prints (e.g., UE may have previously reported measurements from PCI 11 and 6, then HAPS knows it is the bottom cell with PCI 3).

Figure 4A:
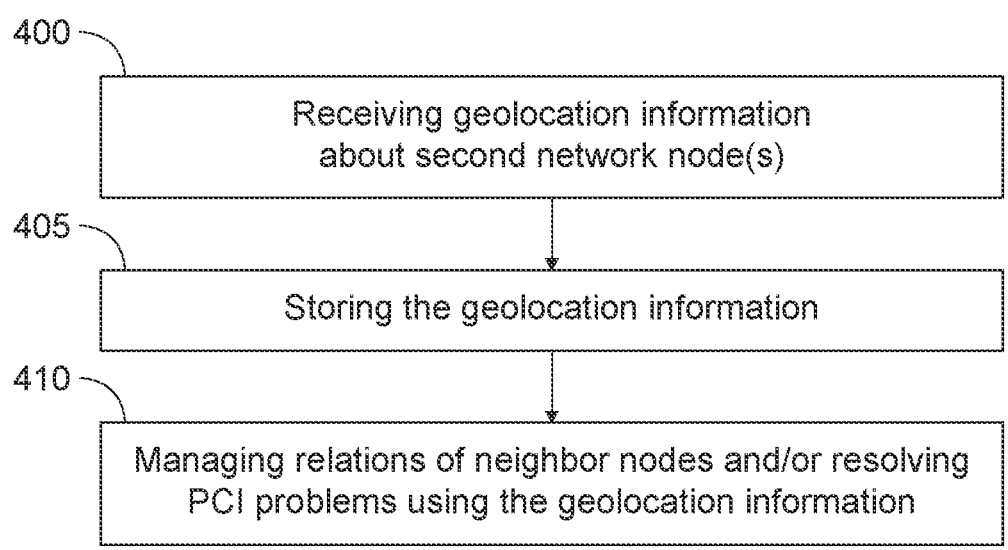
FIG. 4a illustrates an example flow diagram of a method, according to an embodiment.

FIG. 4a illustrates an example flow diagram of a method for managing neighbor relations and coordinating PCIs for HAPS, according to one example embodiment. In an example embodiment, the flow diagram of FIG. 4a may be performed by a network entity or network node associated with a communication system, such as LTE or 5G NR. For instance, in some example embodiments, the network node performing the method of FIG. 4a may include a base station, eNB, gNB, NG-RAN node, and/or a high altitude platform station. Thus, in one example embodiment, the method of FIG. 4a may be performed by a HAPS.

As illustrated in the example of FIG. 4a, the method may include, at 400, a HAPS receiving geolocation information, such as GPS coordinates, of one or more network node(s). The network node(s) may include a terrestrial base station or another HAPS. The receiving 400 of the geolocation information may include receiving the geolocation information from another network node, such as another HAPS, a terrestrial base station, a centralized entity, or a HAPS manager. For example, the receiving 400 may include receiving the geolocation information of the another network node and/or the geolocation information of nodes neighboring the another network node. For example, in one embodiment, the receiving 400 may include receiving, from a terrestrial base station or eNB/gNB, GPS coordinates of neighboring terrestrial base stations or eNBs/gNBs, along with the PCI/ECGI and the GPS coordinates of the terrestrial base station/eNB/gNB. In certain embodiments, the method may include, at 405, storing the received geolocation information.

As further illustrated in the example of FIG. 4a, the method may also include, at 410, managing relations of neighbor network nodes and/or resolving PCI problems, using at least the received geolocation information. For example, the PCI problems may include PCI collision and/or PCI confusion. For example, the managing 410 may include using the received geolocation information to add or remove neighbor relations in terms of PCI/ECGI pairs or PCI/IP address pairs and/or to add or remove X2 connections.

In some embodiments, the receiving 400 may further include receiving geometrical instruction, such as a minimum or maximum distance, from another network node, such as a HAPS manager or OAM, which may determine the strategy to manage neighbor relations. In an embodiment, the method may include informing one or more network node(s) when the neighbor relation to those network node(s) is no longer relevant. For instance, the neighbor relation may be considered no longer relevant when the network node(s) are no longer in the coverage of the HAPS or are not in the direction of movement of the HAPS. According to certain embodiments, the receiving 400 may include receiving the geolocation information and/or geolocation instruction in a configuration update message via X2. For example, in an embodiment, the X2 information configuration update message may be extended to include, in addition to PCI and ECGI, GPS coordinates and/or geolocation instructions. In some embodiments, the storing 405 may include storing the geolocation information, geolocation instructions, PCI and/or ECGI.

In an embodiment, the managing 410 may include determining neighboring nodes to add to a NCL using the PCI/ECGI and geolocation information. For example, based on the GPS coordinates, it can be decided whether to add a cell to the NCL immediately, later on, or not at all. In some embodiments, adding a cell may include setting up an X2 interface, in addition to updating the NCL.

In a further embodiment, the managing 410 may include determining existing neighboring nodes to remove from a NCL, based at least in part on the GPS information. For example, in an embodiment, it may be determined to remove a node from the NCL if the distance increases the estimated HAPS coverage. In some embodiments, where a minimum distance between two terrestrial cells with the same PCI is known, if this minimum distance is large, then the HAPS may determine to keep neighbor relations longer as this would not create any harm. If the minimum distance is short, then the HAPS may determine to remove neighbor relations earlier.

In some embodiments, when the HAPS is aware of a PCI confusion, the managing 410 may include determining, based on the GPS coordinates of the cells causing the PCI confusion, to remove the neighbor relation to avoid the PCI confusion. When the PCI confusion is between cells that are both relevant, the managing 410 may include resolving, provided some rough location information of the UE(s), from the PCI, the ECGI and thereby the correct X2 interface for the handover of the UE(s). For example, in an embodiment, the method may include receiving a measurement report from a UE with the PCI confusion. Rough location information about the UE may be retrieved, for example, based on reported GPS information or based on radio frequency (RF) finger prints (evaluating neighbor measurements from the past). This location information can be used to resolve the PCI, for example, by selecting the cell whose GPS information has the closest distance to the rough location information of the UE. The method may then include initiating a proper handover to the selected target cell.

Figure 4B:
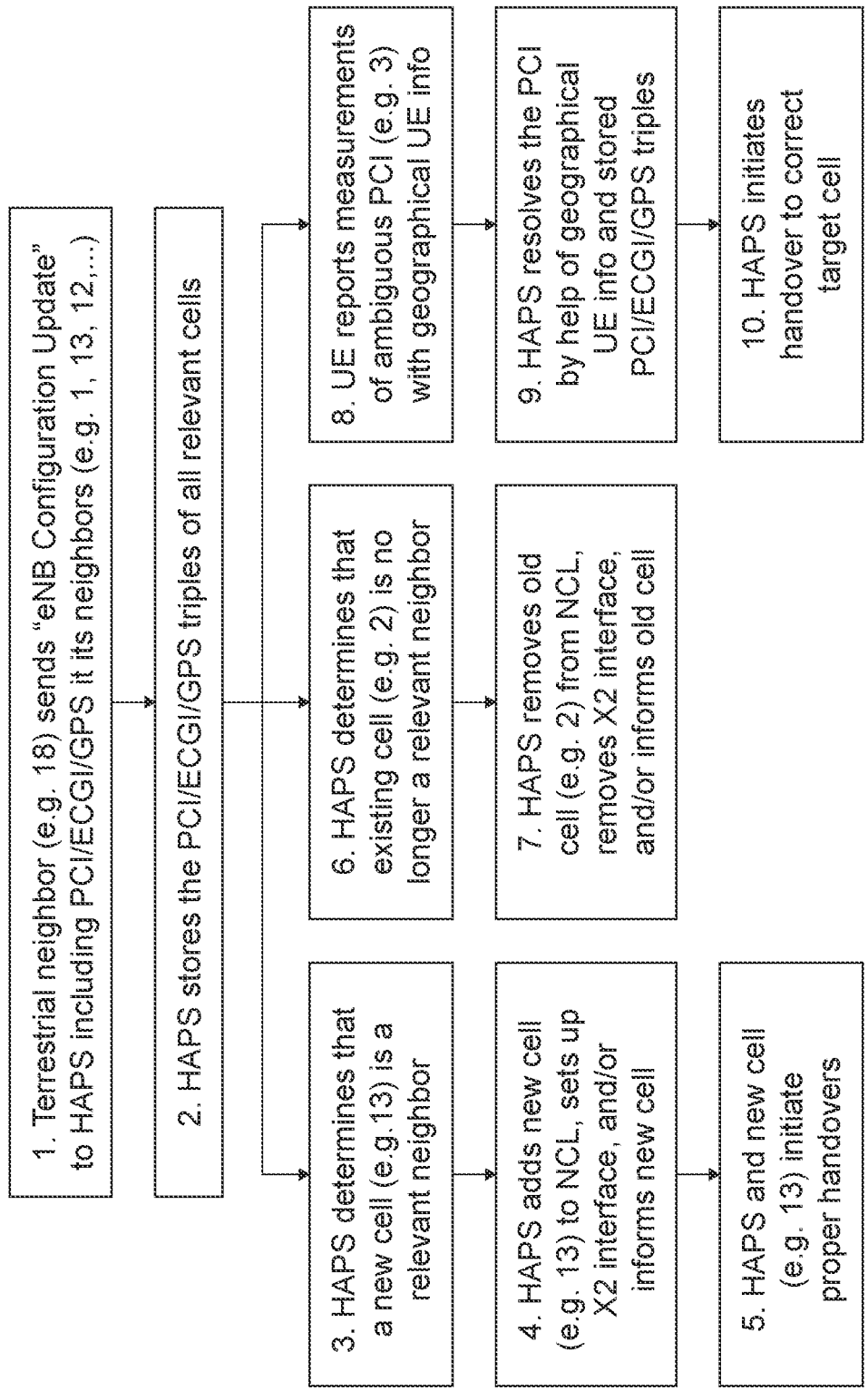
FIG. 4b illustrates an example flow diagram of a method, according to an embodiment.

FIG. 4b illustrates an example flow chart of a method depicting an application or implementation of an example embodiment. As illustrated in the example of FIG. 4b, at 1, a terrestrial neighboring cell (e.g., cell 18 in the example of FIG. 3) may send a configuration update message (e.g., "eNB Configuration Update") to HAPS. The sending of the configuration update message may have already occurred when the neighboring cell (e.g., cell 18) was added. However, the sending of the configuration update message may also occur during a later update (e.g., as specified in 3GPP TS 36.423 and 36.300). In an embodiment, the configuration update message may contain PCIs and corresponding ECGIs of the neighbor(s) of the neighboring cell (e.g., cell 18), as well as GPS coordinates.

As further illustrated in the example of FIG. 4b, at 2, the HAPS may store the PCI/ECGI/GPS triples received for relevant terrestrial cells. In one example, relevant cells may refer to cells that are already in the coverage area or that are in the direction of the movement of the HAPS. In some embodiments, a cell in the opposite direction and/or outside the coverage area of the HAPS would not be stored as a relevant cell.

At 3, the HAPS may detect that a new cell (e.g., cell 13 in the example of FIG. 3, which is stored but not part of the neighbor cell list (NCL) and without X2 interface) enters the coverage area of the HAPS. This detection may be based on the GPS information (the HAPS knows its own GPS location) and an appropriate coverage prediction. Additionally or alternatively, the detection may be based on distance information received from, e.g., a HAPS manager. If the new cell (e.g., cell 13) is closer than the minimum distance between two terrestrial cells with same PCI, the HAPS may detect this cell even if it is not yet in the coverage area (no risk of PCI confusion). Then, at 4, the HAPS may add the new cell to the neighbor cell list (NCL) and set up an X2 interface to the new cell. The HAPS may also inform the new cell about the new neighbor relation, but this could be considered inherent to the setup of the X2 connection. At 5, HAPS and new cell 13 may initiate proper handovers in both directions (i.e., HAPS→13; 13→HAPS).

In the example of FIG. 4b, at 6, the HAPS may also determine that an existing cell (e.g., 2) falls out of its coverage area. Then, at 7, the HAPS may remove the existing cell (e.g., 2) from the NCL, and may also remove the X2 interface. It is noted that the HAPS may also decide to keep the cell to be on the safe side, and only remove it later on, when the distance is larger than a distance information (e.g., minimum distance between two terrestrial cells with same PCI). In an embodiment, the HAPS may inform the old cell that the neighbor relation is no longer relevant (which is inherently done when removing the X2 interface).

According to an embodiment, continuing with FIG. 4b, in the situation of unavoidable PCI confusion (e.g., two terrestrial cells with PCI 3), the GPS information may be used to initiate the handover to the correct cell. For example, at 8, the UE may report measurements with the ambiguous PCI. At 9, the HAPS may retrieve rough location information about the UE, e.g., based on reported GPS information or based on RF finger prints (evaluating neighbor measurements from the past). This can be used to resolve the PCI, e.g., by selecting the cell whose GPS information has the closest distance to the rough location information of the UE. Finally, at 10, the HAPS may initiate a proper handover to the correct target cell.

In addition to the examples discussed above in detail, the exchange of geolocation information or GPS coordinates may be implemented in alternative ways. For instance, in an embodiment, a HAPS may receive a list of (relevant) PCI/ECGI/GPS triples about terrestrial cells from a HAPS manager. This may, for example, replace or supplement the X2 information exchange discussed above.

In an embodiment, terrestrial cells may receive a list of (relevant) PCI/ECGI/GPS triples about HAPS cell(s) from its own OAM. In this embodiment, if the terrestrial cells know the HAPS location, terrestrial cells may follow similar procedures to those described above for HAPS (e.g., FIG. 4). This may have the advantage that less GPS information has to be exchanged (much less HAPS than terrestrial cells), but the geographical HAPS information may have to be updated more often.

According to certain embodiments, PCI collisions and confusions among HAPS can also be resolved using geometrical considerations (since the propagation is very predictable). For instance, from the PCI/ECGI/GPS triples received from existing neighbors, a HAPS may be configured to detect if a HAPS with same PCI comes too close. In this case, one of the HAPS may change the PCI. Again, distance information from another network node, such as a HAPS manager, may assist. For example, the distance information may include a minimum distance between HAPS with same PCI.

Table 1 below provides an example how a configuration update message, such as an eNB Configuration Update message (e.g., as specified in 3GPP TS 36.423), can be extended, for example to include GPS information, according to certain embodiments.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | reject |
| Served Cells To Add | | 0 . . . <maxCellineNB> | | Complete list of added cells served by the eNB | GLOBAL | reject |
| >Served Cell Information | M | | 9.2.8 | | — | — |
| >Neighbour Information | | 0 . . . <maxnoofNeighbours> | | | — | — |
| >>ECGI | M | | ECGI 9.2.14 | E-UTRAN Cell Global Identifier of the neighbour cell | — | — |
| >>PCI | M | | INTEGER (0 . . . 503, . . .) | Physical Cell Identifier of the neighbour cell | — | — |
| >>GPSinfo | M | | GPS coordinates | GPS coordinates of the neighbour cell | — | — |
| >>EARFCN | M | | 9.2.26 | DL EARFCN for FDD or EARFCN for TDD | — | — |
| >>TAC | O | | OCTET STRING (2) | Tracking Area Code | YES | ignore |
| >>EARFCN Extension | O | | 9.2.65 | DL EARFCN for FDD or EARFCN for TDD. If this IE is present, the value signalled in the EARFCN IE is ignored. | YES | reject |
| Served Cells To Modify | | 0 . . . <maxCellineNB> | | Complete list of modified cells served by the eNB | GLOBAL | reject |
| >Old ECGI | M | | ECGI 9.2.14 | Old E-UTRAN Cell Global Identifier | — | — |
| >Served Cell Information | M | | 9.2.8 | | — | — |
| >Neighbour Information | | 0 . . . <maxnoofNeighbours> | | | — | — |
| >>ECGI | M | | ECGI 9.2.14 | E-UTRAN Cell Global Identifier of the neighbour cell | — | — |
| >>PCI | M | | INTEGER (0 . . . 503, . . .) | Physical Cell Identifier of the neighbour cell | — | — |
| >>GPSinfo | M | | GPS coordinates | GPS coordinates of the neighbour cell | — | — |

TABLE 1-continued

| IE/Group Name | Presence | Range | IE type and reference | Semantics description | Criticality | Assigned Criticality |
|---|---|---|---|---|---|---|
| >>EARFCN | M | | 9.2.26 | DL EARFCN for FDD or EARFCN for TDD | — | — |
| >>TAC | O | | OCTET STRING (2) | Tracking Area Code | YES | ignore |
| >>EARFCN Extension | O | | 9.2.65 | DL EARFCN for FDD or EARFCN for TDD. If this IE is present, the value signalled in the EARFCN IE is ignored. | YES | reject |
| >Deactivation Indication | O | | ENUMERATED(deactivated, . . .) | Indicates that the concerned cell is switched off for energy saving reasons | YES | ignore |
| Served Cells To Delete | | 0 . . . <maxCellineNB> | | Complete list of deleted cells served by the eNB | GLOBAL | reject |
| >Old ECGI | M | | ECGI 9.2.14 | Old E-UTRAN Cell Global Identifier of the cell to be deleted | | |
| GU Group Id To Add List | | 0 . . . <maxPools> | | | GLOBAL | reject |
| >GU Group Id | M | | 9.2.20 | | — | — |
| GU Group Id To Delete List | | 0 . . . <maxPools> | | | GLOBAL | reject |
| >GU Group Id | M | | 9.2.20 | | — | — |
| Coverage Modification List | | 0 . . . <maxCellineNB> | | List of cells with modified coverage | GLOBAL | reject |
| >ECGI | M | | ECGI 9.2.14 | E-UTRAN Cell Global Identifier of the cell to be modified | | |
| >Cell Coverage State | M | | INTEGER (0 . . . 15, . . .) | Value '0' indicates that the cell is inactive. Other values Indicates that the cell is active and also indicates the coverage configuration of the concerned cell | | |
| >Cell Deployment Status Indicator | O | | ENUMERATED(pre-change-notification, . . .) | Indicates the Cell Coverage State is planned to be used at the next reconfiguration | | |

TABLE 1-continued

| IE/Group Name | Presence | Range | IE type and reference | Semantics description | Criticality | Assigned Criticality |
|---|---|---|---|---|---|---|
| >Cell Replacing Info | C-ifCellDeploymentStatusIndicatorPresent | | | | | |
| >>Replacing Cells | | 0 . . . <maxCellineNB> | | | | |
| >>>ECGI | | | ECGI 9.2.14 | E-UTRAN Cell Global Identifier of a cell that may replace all or part of the coverage of the cell to be modified | | |

Figure 5A:
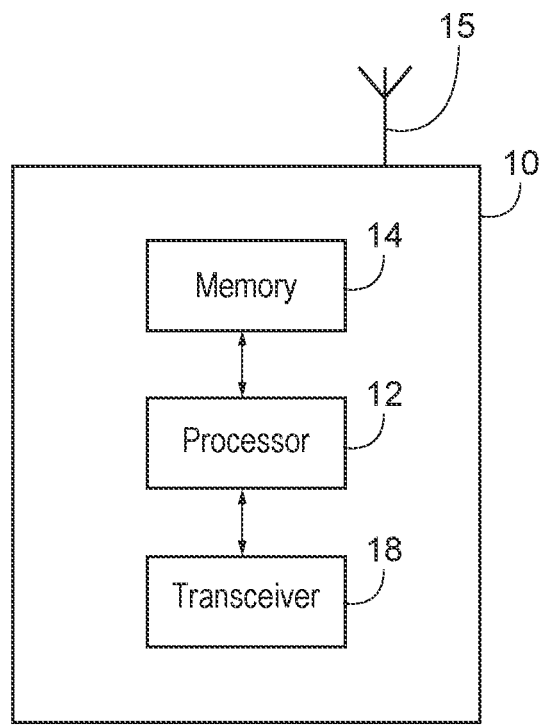
FIG. 5a illustrates an example block diagram of an apparatus, according to an embodiment.

FIG. 5a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), high altitude platform station (HAPS), IAB node, and/or WLAN access point, associated with a radio access network, such as a LTE network, 5G or NR. In example embodiments, apparatus 10 may be or may include a NG-RAN node, an eNB in LTE, gNB in 5G, a HAPS, or the like.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5a.

As illustrated in the example of FIG. 5a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5a, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and/or receive information. The transceiver 18 may include, for example, a plurality of radio interfaces that may be coupled to the antenna(s) 15. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (e.g., digital-to-analog converters and the like), mappers, a Fast Fourier Transform (FFT) module, and/or the like, e.g., to generate symbols or signals for transmission via one or more downlinks and to receive symbols (e.g., via an uplink).

As such, transceiver 18 may be configured to modulate information on to a carrier waveform for transmission by the antenna(s) 15 and to demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, HAPS, IAB node, WLAN access point, or the like. For example, in some embodiments, apparatus 10 may be configured to perform one or more of the processes depicted in any of the flow charts or signaling diagrams described herein, such as those illustrated in FIG. 4a or 4b. In some embodiments, as discussed herein, apparatus 10 may be configured to perform a procedure relating to the management of neighbor network node relations and/or coordinating PCIs.

According to this embodiment, apparatus 10 may be controlled by memory 14 and processor 12 to receive geolocation information, such as GPS coordinates, for one or more network node(s). The network node(s) may be a terrestrial base station or HAPS. In some embodiments, apparatus 10 may be controlled by memory 14 and processor 12 to receive the geolocation information from an other network node, such as another HAPS, a terrestrial base station, a centralized entity, or a HAPS manager. For example, the received geolocation information may include the geolocation information of the other network node and/or the geolocation information of nodes neighboring the other network node. As an example, apparatus 10 may be controlled by memory 14 and processor 12 to receive the geolocation information, from a terrestrial base station or eNB/gNB, GPS coordinates of neighboring terrestrial base stations or eNBs/gNBs, along with the PCI/ECGI and the GPS coordinates of the terrestrial base station/eNB/gNB. In certain embodiments, apparatus 10 may be controlled by memory 14 and processor 12 to store the received geolocation information.

In an embodiment, apparatus 10 may be controlled by memory 14 and processor 12 to manage relations of neighbor network nodes and/or to resolve PCI problems, using at least the received geolocation information. For example, the PCI problems may include PCI collision and/or PCI confusion. According to some embodiments, apparatus 10 may be controlled by memory 14 and processor 12 to use the received geolocation information to add or remove neighbor relations in terms of PCI/ECGI pairs or PCI/IP address pairs and/or to add or remove X2 connections.

In some embodiments, apparatus 10 may be controlled by memory 14 and processor 12 to receive geometrical instruction, such as a minimum or maximum distance, from another network node, such as a HAPS manager or OAM, which may assist in determining the strategy to manage neighbour relations. In an embodiment, apparatus 10 may be controlled by memory 14 and processor 12 to inform one or more network node(s) when the neighbour relation to those network node(s) is no longer relevant. For instance, the neighbor relation may be considered no longer relevant when the network node(s) are no longer in the coverage of the apparatus 10 or are not in the direction of movement of the apparatus 10. According to certain embodiments, apparatus 10 may be controlled by memory 14 and processor 12 to receive the geolocation information and/or geolocation instruction in a configuration update message via X2 interface. For example, in an embodiment, the X2 information in configuration update message may be extended to include, in addition to PCI and ECGI, GPS coordinates and/or geolocation instructions. In some embodiments, apparatus 10 may be controlled by memory 14 and processor 12 to store the geolocation information, geolocation instructions, PCI and/or ECGI.

In an embodiment, apparatus 10 may be controlled by memory 14 and processor 12 to determine neighboring nodes to add to a NCL using the PCI/ECGI and geolocation information. For example, based on the GPS coordinates, apparatus 10 may be controlled by memory 14 and processor 12 to decide whether to add a cell to the NCL immediately, later on, or not at all. In some embodiments, adding a cell may include setting up an X2 interface, in addition to updating the NCL.

In a further embodiment, apparatus 10 may be controlled by memory 14 and processor 12 to determine existing neighboring nodes to remove from a NCL, based at least in part on the geolocation information. For example, in an embodiment, apparatus 10 may be controlled by memory 14 and processor 12 to determine to remove a node from the NCL if the distance increases the estimated coverage area of apparatus 10. In some embodiments, where a minimum distance between two terrestrial cells with the same PCI is known and if this minimum distance is large, then apparatus 10 may be controlled by memory 14 and processor 12 to determine to keep neighbor relations longer as this would not create any issues. If the minimum distance is short, then apparatus 10 may be controlled by memory 14 and processor 12 to determine to remove neighbor relations earlier.

In some embodiments, when the apparatus 10 is aware of a PCI confusion, apparatus 10 may be controlled by memory 14 and processor 12 to determine, based on the GPS coordinates of the cells causing the PCI confusion, to remove the neighbor relation to avoid the PCI confusion. When the PCI confusion is between cells that are both relevant, apparatus 10 may be controlled by memory 14 and processor 12 to resolve, provided some rough location information of the UE(s), the ECGI and thereby determine the correct X2 interface for the handover of the UE(s). For example, in an embodiment, apparatus 10 may be controlled by memory 14 and processor 12 to receive a measurement report from a UE with the PCI confusion. Rough location information about the UE may be retrieved, for example, based on reported GPS information or based on radio frequency (RF) finger prints (evaluating neighbor measurements from the past). In this embodiment, apparatus 10 may be controlled by memory 14 and processor 12 to, with the location information, resolve the PCI, for example, by selecting the cell whose GPS information has the closest distance to the rough location information of the UE. In an embodiment, apparatus 10 may then be controlled by memory 14 and processor 12 to initiate a proper handover to the selected target cell.

Figure 5B:
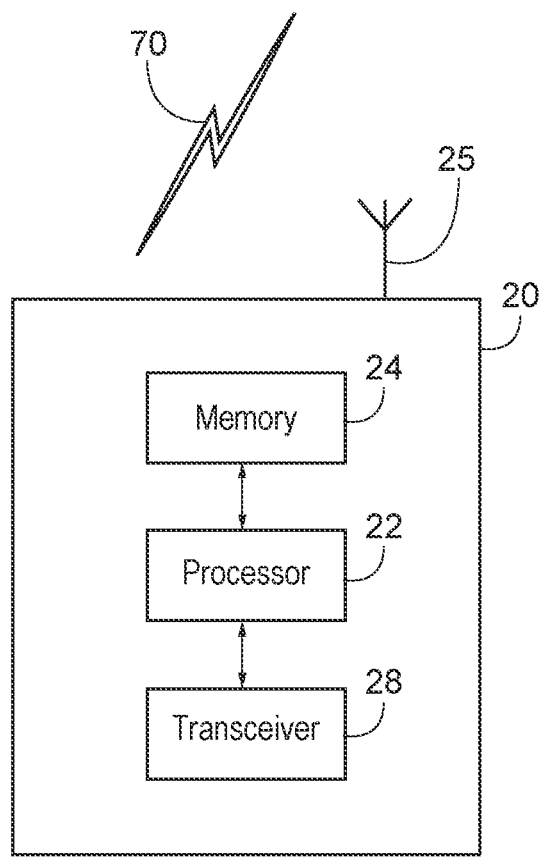
FIG. 5b illustrates an example block diagram of an apparatus, according to an embodiment.

FIG. 5b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5b.

As illustrated in the example of FIG. 5b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22.

The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 4a and FIG. 4b. In certain embodiments, apparatus 20 may be configured to perform a procedure relating to the management of neighbor network node relations and/or coordinating PCIs, for instance. For example, in some embodiments, apparatus 20 may be controlled by memory 24 and processor 22 to provide measurement report(s) to one or more network nodes, such as base stations, eNBs, gNBs, NG-RAN nodes, or HAPS, for example.

Therefore, certain example embodiments provide several technological improvements, enhancements, and/or advantages over existing technological processes and constitute an improvement at least to the technological field of wireless network control and management. For example, certain embodiments enable most functionality can be implemented in a HAPS, thereby minimizing impact to the terrestrial network, base stations or cells. According to certain embodiments, terrestrial cells only need to add GPS coordinates to the existing eNB configuration update. Furthermore, example embodiments are able to solve all PCI problems. In addition, UEs are not impacted and ECGI reading is avoided. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

| | |
|---|---|
| ANR | Automatic Neighbor Relation |
| ECGI | Enhanced Cell Global Identifier |
| eNB | LTE Base Station |
| gNB | 5G or Next Generation NodeB |
| NG-RAN | Next Generation-Radio Access Network |
| NR | New Radio |
| GPS | Global Positioning Service |
| HAPS | High Altitude Platform Systems/Station |
| IP | Internet Protocol |

| | |
|---|---|
| NCL | Neighbor Cell List |
| OAM | Operation and Maintenance |
| PCI | Physical Cell Identifier |

What is claimed is:

1. A method, comprising:
receiving, at a first network node, geolocation information for at least one second network node;
managing, by the first network node, relations of neighbor network nodes of at least one of the first network node or the at least one second network node; and
resolving physical cell identifier problems using the geolocation information,
wherein the first network node comprises a high altitude platform station or flying base station, and wherein the at least one second network node comprises at least one terrestrial base station or at least one high altitude platform station or flying base station.

2. The method according to claim 1 wherein the physical cell identifier problems comprise at least one of physical cell identifier collision or physical cell identifier confusion.

3. The method according to claim 1, wherein the receiving further comprises:
receiving the geolocation information from a third network node, wherein the third network node comprises at least one of high altitude platform station or flying base station, a terrestrial base station, a centralized entity, or a high altitude platform station manager.

4. The method according to claim 1, wherein the geolocation information comprises global positioning service coordinates of the at least one second network node, and wherein the receiving further comprises:
receiving the global positioning service coordinates of the at least one second network node; and
receiving the physical cell identifier and enhanced cell global identifier of the at least one second network node.

5. The method according to claim 1, further comprising:
storing the geolocation information, global positioning service coordinates, and/or physical cell identifier and enhanced cell global identifier of the at least one second network node.

6. The method according to claim 1, further comprising:
receiving geometrical instruction from a fourth network node to assist in determining a strategy to manage the neighbor relations, wherein the fourth network node comprises at least one of a high altitude platform station manager or operation and maintenance.

7. An apparatus, comprising:
at least one processor; and
at least one memory comprising computer program code,
the at least one memory and computer program code are configured, with the at least one processor, to cause the apparatus at least to:
receive geolocation information for at least one first network node;
manage relations of neighbor network nodes of at least one of the apparatus or the at least one first network node; and
resolve physical cell identifier problems using the geolocation information,
wherein the apparatus comprises a high altitude platform station or flying base station, and wherein the at least one first network node comprises at least one terrestrial base station or at least one high altitude platform station or flying base station.

8. The apparatus according to claim 7, wherein the physical cell identifier problems comprise at least one of physical cell identifier collision or physical cell identifier confusion.

9. The apparatus according to claim 7, wherein the at least one memory and computer program code configured to receive geolocation information are further configured, with the at least one processor, to cause the apparatus at least to:
receive the geolocation information from a second network node, wherein the second network node comprises at least one of high altitude platform station or flying base station, a terrestrial base station, a centralized entity, or a high altitude platform station manager.

10. The apparatus according to claim 9, wherein the second network node and the at least one first network node are the same network node.

11. The apparatus according to claim 7, wherein the geolocation information comprises global positioning service coordinates of the at least one first network node, and wherein the at least one memory and computer program code configured to receive geolocation information are further configured, with the at least one processor, to cause the apparatus at least to:
receive the global positioning service coordinates of the at least one first network node; and
receive the physical cell identifier and enhanced cell global identifier of the at least one first network node.

12. The apparatus according to claim 7, wherein the at least one memory and computer program code are further configured, with the at least one processor, to cause the apparatus at least to:
store the geolocation information, global positioning service coordinates, and/or physical cell identifier and enhanced cell global identifier of the at least one first network node.

13. The apparatus according to claim 7, wherein the at least one memory and computer program code are further configured, with the at least one processor, to cause the apparatus at least to:
receive geometrical instruction from a third network node to assist in determining a strategy to manage the neighbor relations, wherein the third network node comprises at least one of a high altitude platform station manager or operation and maintenance.

14. The apparatus according to claim 7, wherein the at least one memory and computer program code configured to receive geolocation information are further configured, with the at least one processor, to cause the apparatus at least to:
receive the geolocation information and/or geometric instruction in a configuration update message via X2 interface.

15. The apparatus according to claim 7, wherein the at least one memory and computer program code configured to manage relations of neighbor network nodes are further configured, with the at least one processor, to cause the apparatus at least to:
use the geolocation information to perform at least one of:
adding or removing neighbor relations between the apparatus and the at least one first network node; and
adding or removing X2 connections between the apparatus and the at least one first network node.

16. The apparatus according to claim 7, wherein the at least one memory and computer program code configured to manage relations of neighbor network nodes are further configured, with the at least one processor, to cause the apparatus at least to:
- use global positioning service coordinates, physical cell identifier and enhanced cell global identifier of the at least one first network node to determine whether the at least one first network node is a relevant neighbor of the apparatus.

17. The apparatus according to claim 7, wherein the at least one memory and computer program code are further configured, with the at least one processor, to cause the apparatus at least to:
- inform the at least one first network node when a neighbor relation is no longer relevant.

18. A computer program embodied on a non-transitory computer-readable storage medium, the computer program comprising program code for controlling a process to execute a process, the process comprising:
- receiving, at a first network node, geolocation information for at least one second network node;
- managing, by the first network node, relations of neighbor network nodes of at least one of the first network node or the at least one second network; and
- resolving physical cell identifier problems using the geolocation information,
- wherein the first network node comprises a high altitude platform station or flying base station, and wherein the at least one second network node comprises at least one terrestrial base station or at least one high altitude platform station or flying base station.

* * * * *